(No Model.)
J. W. ELLS.
MEANS FOR CARRYING OFF ESCAPING GAS FROM GAS MAINS.
No. 378,544. Patented Feb. 28, 1888.
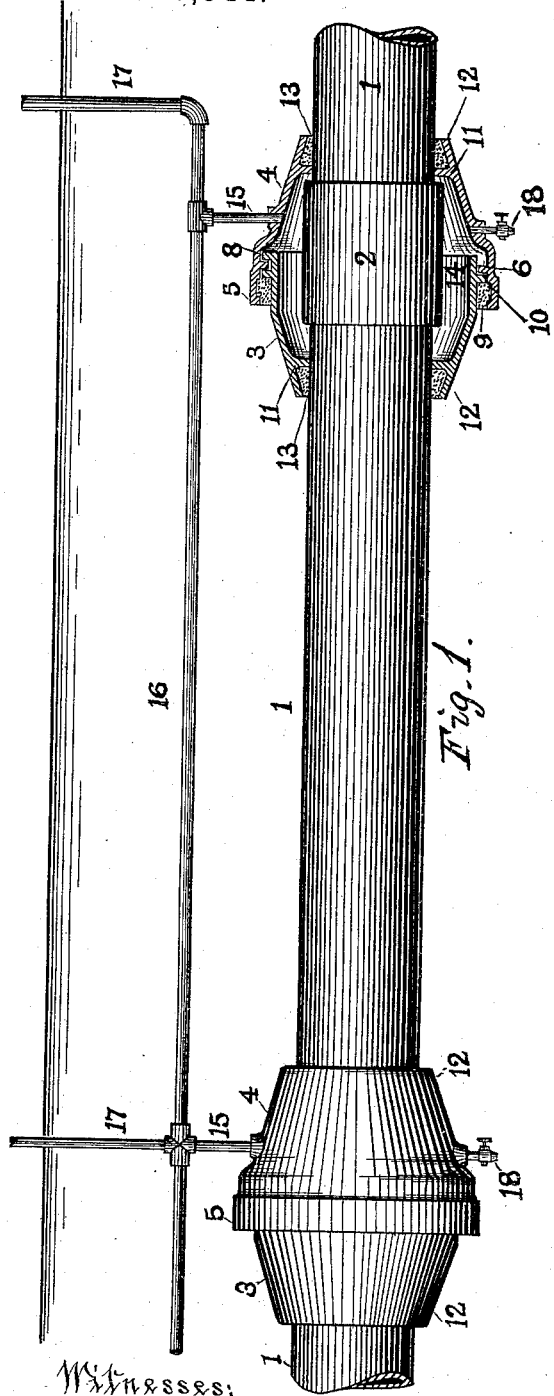
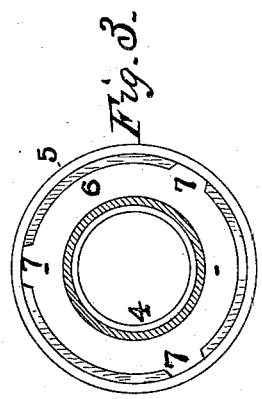

UNITED STATES PATENT OFFICE.

JOSIAH W. ELLS, OF PITTSBURG, PENNSYLVANIA, ASSIGNOR TO GEORGE WESTINGHOUSE, JR., OF SAME PLACE.

MEANS FOR CARRYING OFF ESCAPING GAS FROM GAS-MAINS.

SPECIFICATION forming part of Letters Patent No. 378,544, dated February 28, 1888.

Application filed November 2, 1886. Serial No. 217,851. (No model.)

*To all whom it may concern:*

Be it known that I, JOSIAH W. ELLS, a citizen of the United States, residing at Pittsburg, in the county of Allegheny and State of Pennsylvania, have invented a new and useful Improvement in Means for Receiving and Carrying Off Gas Escaping from Joints and Couplings of Underground Gas-Pipes, of which the following is a specification.

In cities and towns where natural gas is now conducted through pipes arranged along and under streets great difficulty is experienced in keeping the joints of such pipes sufficiently tight to prevent gas from leaking through the same, and many devices have been used to catch the escaping gas and conduct it to a place of free and safe discharge above the surface of the ground. The means generally employed for such purposes consist of a metallic box or "casing," formed in sections held together and around the separate joints of a gas-pipe by numerous bolts and nuts, thus forming a chamber for receiving the escape-gas and from which it is conducted by small pipes. The use of bolts and nuts in the construction of a gas-pipe casing involves not only the expense of such bolts and nuts, but also the drilling of numerous holes in the flanges of the casing, to say nothing of time lost in putting the parts together.

The object of my present invention is to provide a casing the parts of which are easily constructed and secured, the one to the other, without the use of bolts, nuts, or holes drilled therefor, and when properly applied around the joint and coupling of a gas-main are not liable to separate therefrom or change their relative positions.

The nature and scope of my invention will be readily understood from the following description, taken in connection with the accompanying drawings, wherein—

Figure 1 represents a portion of an underground gas-pipe or sectional main provided with joints and couplings inclosed by means of gas-tight chambers or casings, shown in outside and sectional elevation, together with small supplemental pipes leading therefrom for the purpose of conducting away escape-gas leaking from said joints; Fig. 2, the large end of a circular metallic bowl or that part of a casing provided with a projecting rim containing an inwardly-extending annular flange through which are cut suitable locking-recesses, as will hereinafter be described; Fig. 3, an end view of the opposite bowl or half of the casing, provided with outwardly-projecting lugs and a low annular wall or collar situate a little distance from and behind the same.

In practice the several lengths comprising the main pipe 1 are united, end to end, by means of couplings or cylindrical sockets 2, thus forming a series of joints along the entire line—a mode of construction that largely prevails in pipes for the conduction of natural gas, an element so subtle that serious accidents have occurred to life and property by its escape from defective pipe-joints. To prevent such leaking gas from reaching and spreading through the earth into dwellings, I have inclosed each single joint and coupling 2 of the main pipe 1 within a separate case, which consists of two hollow circular bowls, 3 and 4, each resting upon and adjustable along the lengths of the pipe, and connected together by the expanded rim 5 of one bowl, 4, overlapping the contiguous edge or rim of the adjoining bowl 3, Within and around the enlarged overlapping rim 5 is an annular ring, 6, cut away at several points to form openings 7, through which outwardly-projecting lugs 8 on the inner or opposite bowl, 3, are adapted to easily pass, so that by a partial rotation of either bowl the lugs will be made to occupy a position directly behind the solid portions of the annular ring 6 or the remaining parts thereof, and thus effectually lock the bowls together. The overlapping portion or rim 5 of the expanded bowl 4 is carried sufficiently far over the inner bowl or shell, 3, to form between them an annular recess for the introduction of a suitable packing, 9; and to prevent displacement thereof the extreme edge of the expanded rim 5 is turned a short distance inward. A light flange, 10, is formed exteriorly around the inner bowl, 3, near its lugs 8, to cover or conceal the openings in the ring of the opposite bowl, 4, and prevent the packing 9 from coming in contact or interfering with the locking device.

Integral with each bowl is an inwardly-projecting wall, 11, closely encircling the main pipe 1, whereby the bowls or shells are held in perfect alignment therewith. A longitudinal extension, 12, of each bowl outwardly beyond its interior wall, 11, forms an annular recess, filled with packing 13 that offers material support to the bowls and prevents any escape of gas around the main pipe in that direction. The bowls 3 and 4, when constructed, applied, and united as described, constitute a gas-tight chamber, 14, around each joint and coupling of the main pipe for reception of such gas as may leak therefrom.

Leading from each chamber or casing 14 is a vent-pipe, 15, that may extend to and terminate a sufficient distance above the surface of the ground to insure the harmless escape of gas into the atmosphere; but I prefer to have the several vent-pipes 15 leading from the separate chambers or casings joined to and in communication with a supplemental pipe, 16, that extends parallel with the main and a little distance from it, whereby the escaping gas from each chamber is directed into one or more open stand-pipes, 17, that may be located near each other or a great distance apart. The several chambers or casings, being thus provided with a free and unobstructed outlet therefrom, are not likely to accumulate any great pressure of gas, being simply designed to prevent such waste gas from passing through the surrounding earth and collecting in sewers, basements, and cellars of buildings and, by mixing with air therein, produce a dangerously explosive compound.

As leakage of gas through the joints of the main is gradual, the vent-pipes are generally sufficient to conduct it away; but occasionally the chambers fill with water or other liquid that finds entrance therein and interferes with the outward flow and discharge of waste gas. An undue pressure then accumulates in the chamber that either forces out its packing or bursts the casing. To prevent this I have provided each casing or chamber 14 with a suitable valve or cock, 18, whereby and through which liquid collected in the chamber may be drawn off or blown out.

The advantages of my invention consist in providing a simple, cheap, and effective means whereby a chamber is formed around each separate and independent joint of the main pipe without the use of bolts, nuts, screws, or separable clamping devices, leaving other portions of the main pipe easy of access for the purpose of ready inspection or attaching service-pipes thereto. In this construction of joint-casing each bowl is adjustable along or around the main pipe, whereby a single joint thereof may be exposed for inspection or repair and the bowls reinstated without disturbing other portions of the line.

I am aware that casings for gas-pipe couplings have been formed in sectional parts, each provided with a flange united the one to the other by means of bolts that pass through the same, and that various packings have been used in connection therewith. I claim no such device; neither do I claim, broadly, a vent-pipe applied to a gas-tight chamber surrounding or inclosing the joint of a pipe; but I do claim—

1. In a single pipe-line, the combination of two lengths of pipe with a chamber formed around the pipe ends by the junction of two bowls or shells adjustable along said lengths of pipe, and an enlarged or expanded rim on one bowl or shell that extends over the rim of its adjoining bowl or shell.

2. The combination of two lengths of pipe with a chamber formed around the pipe ends by the junction of two bowls or shells adjustable along said lengths of pipe, an enlarged or expanded rim on one bowl or shell that extends over the rim of its adjoining bowl or shell, and a means for the free escape of gas from said chamber.

3. The combination of two lengths of pipe with a chamber formed around the pipe ends by the junction of two bowls or shells adjustable along said lengths of pipe, an enlarged or expanded rim on one bowl or shell that extends over the rim of its adjoining bowl or shell, and an interlocking device whereby the shells or bowls are securely held together.

4. The combination of two lengths of pipe with a chamber formed around the pipe ends by the junction of two bowls or shells adjustable along said lengths of pipe, an enlarged or expanded rim on one bowl or shell that extends over the rim of its adjoining bowl or shell, a suitable interlocking device, whereby the shells are held together, and a packing interposed between the ends of said bowls and the inclosed gas-pipe.

5. The combination of two lengths of pipe with a chamber formed around the pipe ends by the junction of two bowls or shells adjustable along said lengths of pipe, and a means whereby liquid matter collected in said chamber may be drawn off or blown out.

JOSIAH W. ELLS.

Witnesses:
M. E. HARRISON,
JNO. H. RONEY.